US 8,729,476 B2

(12) United States Patent
Koch et al.

(10) Patent No.: US 8,729,476 B2
(45) Date of Patent: May 20, 2014

(54) RADIOMETRIC ELECTRICAL LINE SENSOR IN COMBINATION WITH MECHANICAL ROTATING MIRROR FOR CREATING 2D IMAGE

(75) Inventors: Stefan Koch, Oppenweiler (DE); Marc Guthoerl, Delmenhorst (DE)

(73) Assignee: Sony Corporation, Tokyo (JP)

( * ) Notice: Subject to any disclaimer, the term of this patent is extended or adjusted under 35 U.S.C. 154(b) by 235 days.

(21) Appl. No.: 12/630,116

(22) Filed: Dec. 3, 2009

(65) Prior Publication Data
US 2010/0193688 A1 Aug. 5, 2010

(30) Foreign Application Priority Data
Dec. 23, 2008 (EP) .................................... 08172714

(51) Int. Cl.
*G01J 5/08* (2006.01)
(52) U.S. Cl.
USPC ......... 250/353; 250/336.1; 348/164; 348/166
(58) Field of Classification Search
USPC ............. 250/336.1, 338.1; 343/755; 348/164, 348/166
See application file for complete search history.

(56) References Cited

U.S. PATENT DOCUMENTS

| 4,056,720 A | 11/1977 | Williams, Jr. et al. |
| 4,504,835 A | 3/1985 | Howard et al. |
| 5,041,852 A * | 8/1991 | Misawa et al. ............... 396/55 |
| 5,905,472 A * | 5/1999 | Wolfson et al. ............... 343/772 |
| 6,353,224 B1 * | 3/2002 | Sinclair et al. ............... 250/336.1 |
| 6,396,448 B1 | 5/2002 | Zimmerman et al. |
| 6,556,174 B1 | 4/2003 | Hamman et al. |
| 6,777,684 B1 | 8/2004 | Volkov et al. |
| 6,963,375 B1 * | 11/2005 | Lundberg ....................... 348/335 |
| 2005/0093733 A1 * | 5/2005 | Lovberg et al. ................ 342/22 |
| 2005/0122556 A1 * | 6/2005 | Lettington ..................... 359/201 |
| 2006/0022140 A1 | 2/2006 | Connelly et al. |
| 2008/0169963 A1 | 7/2008 | White et al. |
| 2009/0225311 A1 * | 9/2009 | Umetsu ......................... 356/317 |
| 2010/0182434 A1 * | 7/2010 | Koch et al. .................... 348/164 |

FOREIGN PATENT DOCUMENTS

| FR | 2 651 071 | 2/1991 |
| JP | 11-46325 | 2/1999 |
| WO | WO 2004/084542 A1 | 9/2004 |
| WO | WO 2006/013379 A2 | 2/2006 |
| WO | WO 2007/018097 A1 | 2/2007 |

OTHER PUBLICATIONS

Chinese Office Action issued Feb. 27, 2013, in China Patent Application No. 200910215327.X (with English translation).

* cited by examiner

*Primary Examiner* — Casey Bryant
(74) *Attorney, Agent, or Firm* — Oblon, Spivak, McClelland, Maier & Neustadt, L.L.P.

(57) ABSTRACT

The present invention relates to the field of two dimensional (2D) radiometric imaging. The present invention especially relates to a sensor unit. The sensor unit according to the present invention comprises a reflecting element mounted so as to be rotatable around an axis of rotation and a line sensor operating in the microwave, millimeter wave and/or terahertz frequency range and having its field of view directed towards the reflecting element, whereby the axis of rotation intersects with a reflection plane of the reflecting element.

10 Claims, 4 Drawing Sheets

RADIOMETRIC ELECTRICAL LINE SENSOR IN COMBINATION WITH MECHANICAL ROTATING MIRROR FOR CREATING 2D IMAGE

FIELD OF THE INVENTION

The present invention relates to the field of two dimensional (2D) radiometric imaging. The present invention especially relates to a sensor unit.

DESCRIPTION OF THE PRIOR ART

Radiometric imaging uses electromagnetic radiation to obtain images of any kind of object. Radiometric imaging is used in a multitude if applications including military, surveillance/security, geometric, geologic, and industrial applications. By using different frequencies/wavelength, different images can be obtained and different properties of imaged objects can be obtained. The wavelengths ranging from of 1000 mm to 1 mm are commonly referred to as microwaves. Other definitions cite 300 mm for the upper bound of the microwave spectrum and 10 mm for the lower bound. Electromagnetic radiation in the range from 100 mm to 10 mm is commonly referred as centimeter waves and radiation in the range from 10 mm to 1 mm is commonly referred to millimeter waves. Submillimeter waves are commonly seen as ranging from 1 mm to 0.1 mm, but may also comprise still smaller wavelengths from the far infrared. Submillimeter waves are also referred to as Terahertz radiation. The smaller the wavelength, the higher is the attainable resolution. Microwaves, millimeter waves and submillimeter waves penetrate e.g. clothes any may be used to detect objects carried by human beings under the clothes.

In the optical region, cameras having a two dimensional field of view allowing to obtain an image of the object are well known and available at low prices. At other frequency regions of the electromagnetic spectrum, sensors operable to take a two dimensional image might not be available commercially or might be very expensive.

Active and passive sensor are known. Active sensors (e.g. radar sensors) do emit electromagnetic radiation and detect reflected radiation (response radiation), whereas passive sensors do not emit electromagnetic radiation and do detect radiation emitted by a sensed object. Passive sensor may, for example, detect black body radiation emitted by an object due to its temperature according to Planck's law.

It is well known to use a single pixel sensor in combination with a rotating mirror for creating a line scanner/sensor.

By mounting such systems on moving objects like planes, helicopters or satellites, a 2D image can be created. Thus, the 2D image is created out of the rotation of the mirror and the movement of the sensor itself.

Another known technique for creating a 2D image is fully electronic scanning using e.g. phased array antennas. These kind of antennas are created out of a high number of single sensors arranged in two dimensions. The array may extends tens of centimeters or even some meters in both of the two dimensions. The number of single sensors is directly related to the resolution of the phased array. The single sensors are operated with individual signals having a specific phase relation to each other in order to achieve a specific direction of the antenna beam. Each direction corresponds to a specific phase combination. Phased array antennas offer high flexibility but the high number of single sensors and the electronic circuit for providing the phase relations makes this design very complex and expensive.

BRIEF DESCRIPTION OF THE PRESENT INVENTION

It is an object of the present invention to provide for an inexpensive sensor unit for taking a two dimensional image in the microwave, millimeter wave and/or Terahertz frequency range. This problem is solved by providing the sensor unit according to the present invention.

The sensor unit according to the present invention comprises a reflecting element mounted so as to be rotatable around an axis of rotation and a line sensor operating in the microwave, millimeter wave and/or terahertz frequency range and having its field of view directed towards the reflecting element, whereby the axis of rotation intersects with a reflection plane of the reflecting element.

Thus, a 2D image can be obtained using a relatively small and inexpensive 1D line sensor. The size, cost and complexity of the sensor unit is small compared to the prior art.

Advantageously, the axis of rotation is parallel to a field of view plane of the line sensor.

Advantageously, the line sensor is mounted on the axis of rotation.

Advantageously, the line sensor is adapted to electrically scan its field of view.

Advantageously, the line sensor is a frequency sweeping line sensor.

Advantageously, the sensor unit further comprises an image processor for compensating an inclination of the reflected field of view plane due to a rotation of the reflective element.

Advantageously, the sensor unit further comprises one or more further line sensors operating in the microwave, millimeter wave and/or terahertz frequency range and having the respective one or more fields of view directed towards the reflective element, whereby the field of view plane of each line sensor intersects with the field of view plane of each other line sensor. Hereby, when the number of line sensors is n, the n field of view planes of the n line sensors are advantageously provided at equal angular distance σ=180°/n. Alternatively, the n field of view planes of the n line sensors are advantageously provided at an angular distance σ≤180°/n.

SHORT DESCRIPTION OF THE FIGURES

DESCRIPTION OF THE PREFERRED EMBODIMENTS

Figure 1:
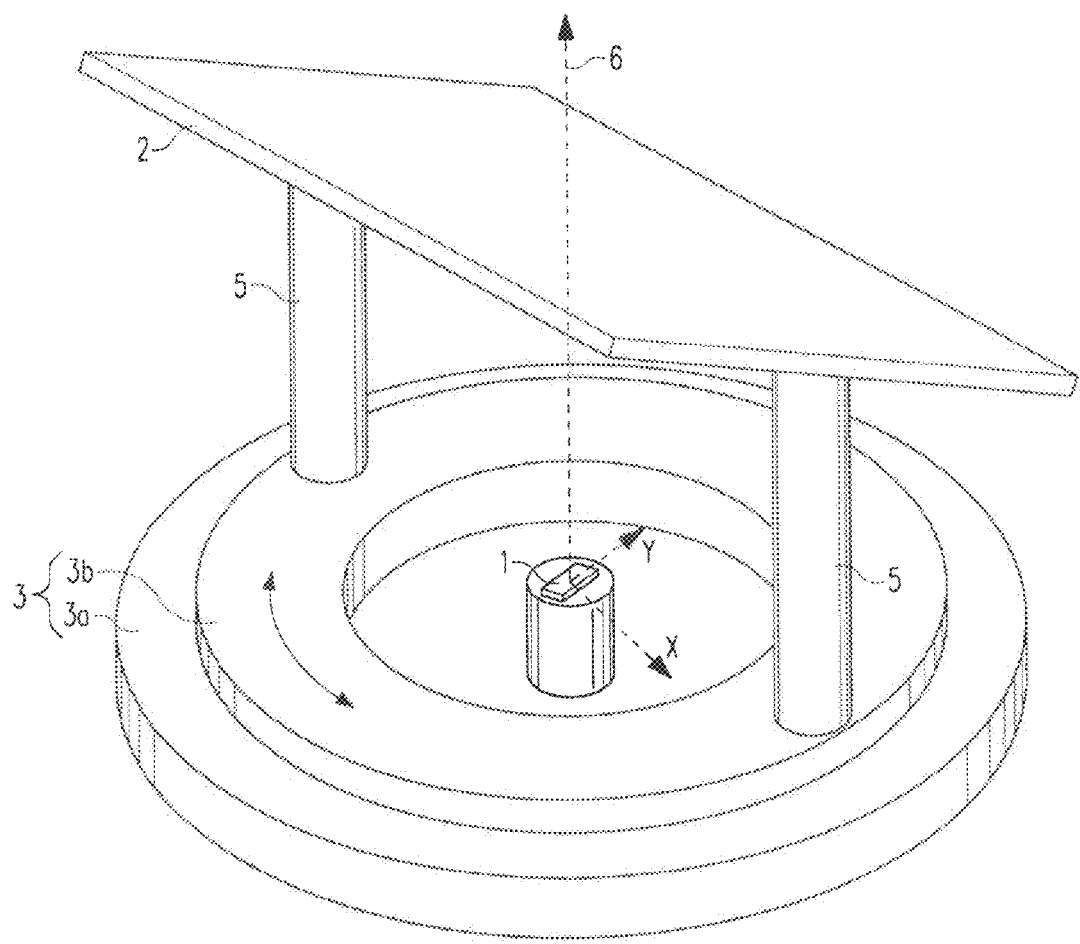
FIG. 1 shows a first embodiment of the sensor unit according to the present invention.

FIG. 1 shows a first embodiment of the sensor unit according to the present invention. The sensor unit 1 comprises a fixed mounted line sensor 1 and a rotating reflective element 2, in the following termed "mirror". The mirror 2 as depicted is of rectangular shape, but a circularly or elliptically or otherwise shaped mirror 2 is possible to. The mirror may have a flat (as depicted) or may have a curved reflecting surface. When the mirror is flat, the reflecting surface of the mirror 2 is (defines) a reflection plane of the mirror 2. When the mirror is not flat but curved, the principal plane of the mirror 2 is (defines) a reflection of the mirror 2. The line sensor 2 operates in the microwave, millimeter wave and/or Terahertz frequency range and is arranged so as to view reflections in the mirror 2. The mirror 2 is reflective for the wavelengths of the range of operation of the line sensor 1. Eventually, the mirror may be or be made from a metal, a meta material or a mirror (in the narrow sense). A motor 3 comprising a fixed mounted part 3a and a movable part 3b is provided. The fixed mounted motor part 3a and the movable (rotatable) motor part 3b are of annular shape but other configurations are possible. The mirror 2 is fixed to the movable part 3b with two supporting elements 5. The supporting elements 5 are of cylindrical shape with one end attached to the movable part 3b and the other end attached to the mirror 2. The supporting elements 5 are arranged in diametrical opposition on the annular shaped movable motor part 3b. As the mirror 2 is rotatable and the line sensor 1 is fixed, the mirror 2 is rotatable in relation to the line sensor 1.

Figure 2:
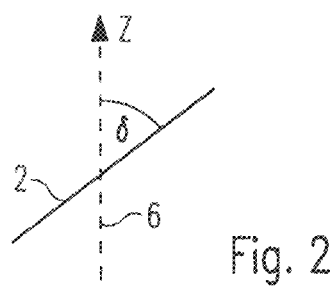
FIG. 2 shows the definition of a mirror inclination angle.

Further shown is a right handed Cartesian coordinate system with coordinate axes x, y, and z. For the purpose of ease of explanation only, the x- and y-axes correspond to horizontal directions and the z-axis correspond to the vertical direction. The movable motor part 4 and the mirror 2 are rotatable around an axis of rotation 6 which coincides with the z-axis. The axis of rotation 6 intersects with the mirror 2 (intersects with the reflection plane of the mirror 2). The mirror 2 (the reflection plane) might intersect with the rotation axis 6 at any angle δ between 0° exclusive and 90° exclusive (see FIG. 2 for a definition of the angle δ). However, when the angle is very small, the mirror 2 has to be very large and when the angle is very large, the motor parts 3a, 3b and/or the line sensor 1 might block the sensor's field of view. The axis of rotation 6 passes through the center of the annular movable motor part 3b and the center of the annular fixed motor part 3a.

Figure 3:
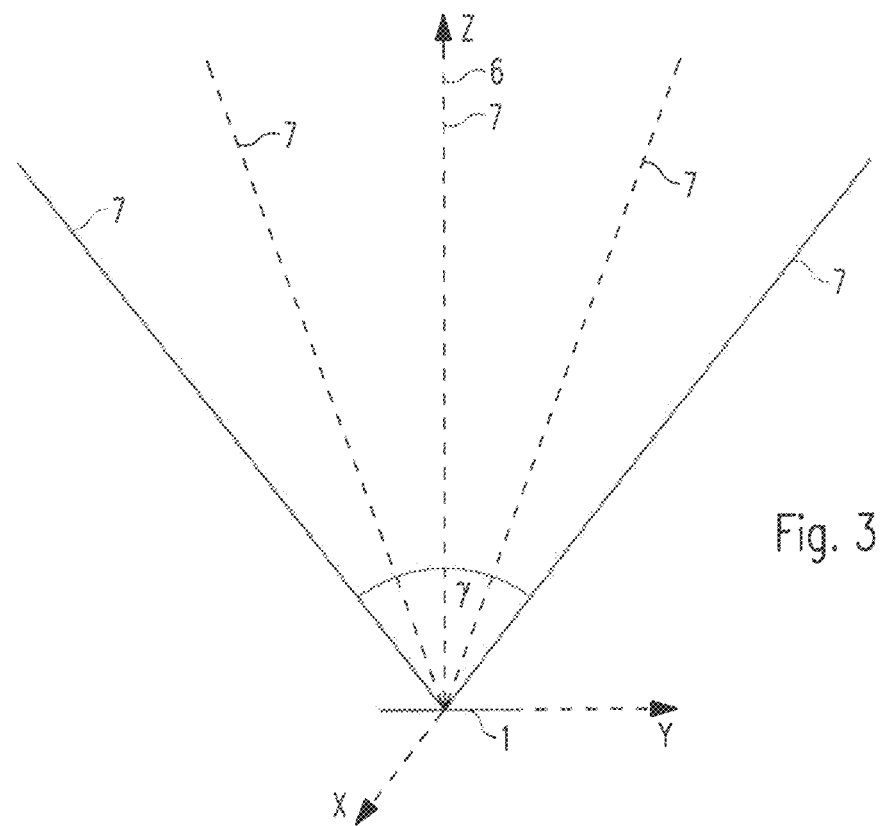
FIG. 3 illustrates the field of view of the line sensor according to the first embodiment.

FIG. 3 illustrates the field of view of the sensor 1. While the field of view of a line sensor is often referred as one dimensional, the notion 'field of view' is also used indicate the two dimensional area within which radiation from a sensed object or from infinity travels to the line sensor 1. This two dimensional area (the field of view) defines and lies within a plane which is called the field of view plane. In the embodiment, the field of view lies within the vertical y-z-plane. The y-z-plane is the field of view plane of the line sensor 1. Generally, it is possible however that the field of view deviates from the vertical. The field of view is of substantially conical shape and has an opening angle γ. The field of view is composed of a plurality of antenna emission and/or reception patterns (antenna beams). The antenna beam width advantageously is very small (very narrow antenna beam) so that a high resolution is obtained. Each antenna beam has a different direction 7. For ease of presentation, FIG. 3 shows five antenna beam directions 7 only. Typically, a few tens, hundreds or even thousands of antenna beam directions 7 will be provided. Each antenna beam direction 7 corresponds to a pixel. Also, an antenna beam direction might be varied continuously. The axis of rotation 6 lies in the center of the field of view. In other words, the axis of rotation 6 divides the field of view in two equal parts. Or, more generally, the field of view is mirror symmetrical in relation to the vertical x-z-plane. Generally, it is possible however that the field of view is not centered around the rotation axis 6 or the x-z-plane. In this embodiment, the sensor 1 and the origin of all antenna beam directions 7 is located on the axis of rotation.

The line sensor 1 might be for example be a sweeping line sensor, in which one antenna beam direction 7 is sensed at a time. Sweeping advantageously is electric and not mechanic, since electric sweeping is faster and less error prone. For example, the sensor 1 might be a well known frequency sweeping line sensor (frequency scanning antenna). Alternatively, all antenna beam directions 7 may be sensed simultaneously. This provides for even faster scanning but requires a more complex and more expensive sensor 1.

Figure 4:
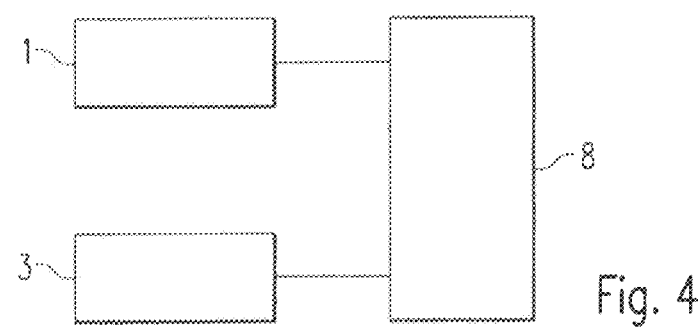
FIG. 4 shows a schematic representation of the electronic components of the sensor unit.

Advantageously, the sensor unit comprises a processing and control unit 8 for controlling the operation of the line sensor 1 and the motor 3 as schematically depicted in FIG. 4.

Figure 5:
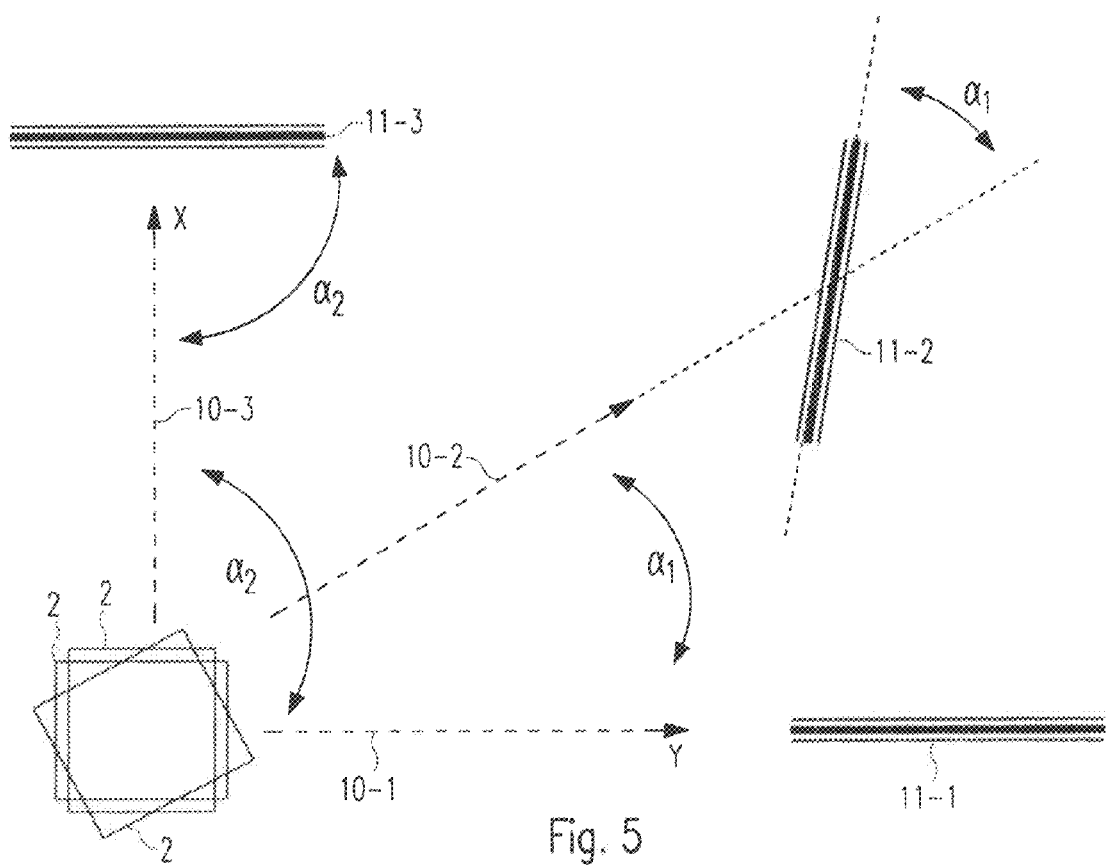
FIG. 5 illustrates operation of the sensor unit.

The operation of the sensor unit is further explained in relation with FIG. 5. With the sensor unit, a 360° panorama image of a region around the sensor unit can be obtained. The scanned region corresponds to a (closed) ribbon. The higher the mirror inclination angle δ (the more the mirror 2 is horizontal), the lower the imaged region will be located in relation to the sensor unit. With the field of view arranged exactly as described above, the ribbon is substantially arranged horizontally. When—in departure thereof—the field of view plane is not vertical, the ribbon will deviate from the horizontal. Similarly, when—in departure of the above described arrangement—the field of view is not mirror symmetric in relation to the x-z-plane or to a plane parallel to the x-z-plane, the ribbon will deviate from the horizontal. Finally, when the field of view is mirror symmetric in relation to a plane parallel to the x-z-plane but—in departure of the above described arrangement—is not mirror symmetric in relation to the x-z-plane, the ribbon will deviate from the horizontal. In the last case however, the departure from horizontal arrangement is small (negligible) when the imaged region is far and/or the mirror inclination angle δ is large.

FIG. 5 shows three image taking directions (corresponding to mirror rotation angles α) 10. The first image taking direction 10-1 corresponds to a mirror rotation angle of 0° and is along the y-axis (more generally within the y-z plane). When in the first image taking direction 10-1, a first line 11-1 is scanned. The second image taking direction 10-2 corresponds to a mirror rotation angle $α_1$ larger than 0° and smaller than 90° (e.g.) 45°. When in the second image taking direction 10-2, a second line 11-2 is scanned. The third image taking direction 10-3 corresponds to a mirror rotation angle $α_2=90°$ and is along the x-axis (more generally within the x-z-plane). When in the third image taking direction, a line 11-3 is scanned. When the mirror 2 is rotated, the angle between the image taking direction 10 and the scanned line 11 changes the same amount. In the convention used, the angle between the picture taking direction 10 and the scanned line 11 is the same as the mirror rotation angle α.

At 0°, the scanning line 11-1 moves perpendicular to its extension and the scanning ribbon has maximum width. When the mirror rotation angle α increases, the scanning line 11-2 moves askew to its extension and the width of the scanning ribbon decreases. At 90°, the scanning line 11-3 moves along its extension and the width of the scanning ribbon decreases (degenerates) to zero. Similarly, at 180° the scanning ribbon has full width and at 270° the width decreases to zero. The scanning ribbon is said to have dead spots at 90° and 270°.

Thus, a 2D image can be obtained using a small and inexpensive 1D line sensor. The size, cost and complexity of the sensor unit is small compared to the prior art.

The processing and control unit 8 may be adapted to compensate the variation of the angle between the image taking direction 10 and the scanned line 11 using image processing technology (hardware and/or software) so that a non distorted image is obtained. Of course, it can not compensate for the decrease of the ribbon width, that is, the scanned area is the same with or without compensation. In order to compensate for the decrease of ribbon width (and effectively provide a constant or more constant ribbon width), the line sensor 1 might be operated with different field of width opening angles γ depending on the mirror rotation angle α. Compensation by increasing the opening angle fails at and near the dead spots, however.

The width of an image is given by the variation Δα of the mirror rotation angle α. It is envisaged that the above solution using a single line sensor 1 is used for image widths which are considerably smaller than 180°, for example, 120°, 90°, 60°, 30° or even less. Such images are advantageously centered around α=0° or α=180°. In the case of a 360° image, the shape for the mirror 2 which provides for the least mirror area is an ellipse. When images of a smaller width Δα are taken, the image area can be further reduced e.g. by adopting a bow tie shape. For very small image widths Δα, an elongated mirror of substantially rectangular form (line mirror) might be employed.

Figure 6:
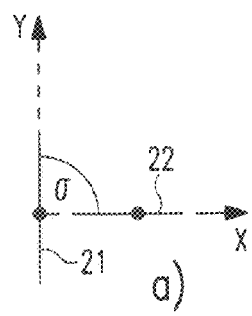
FIG. 6 shows schematic arrangements of line sensor according to a further embodiment of the present invention.
Figure 6:
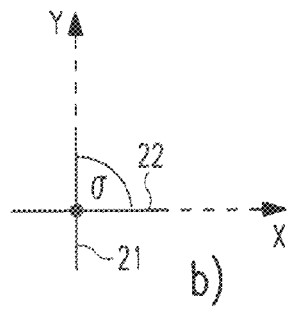
Figure 6:
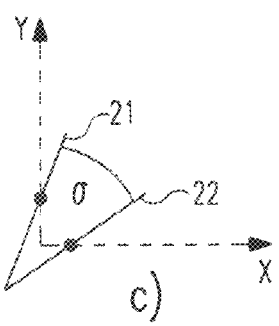
Figure 6:
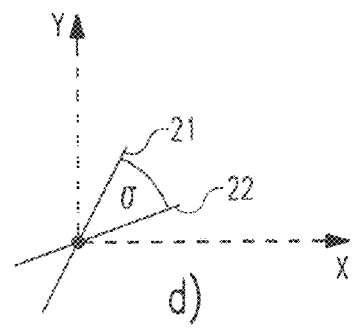
Figure 6:
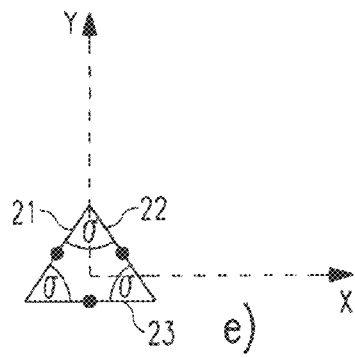
Figure 6:
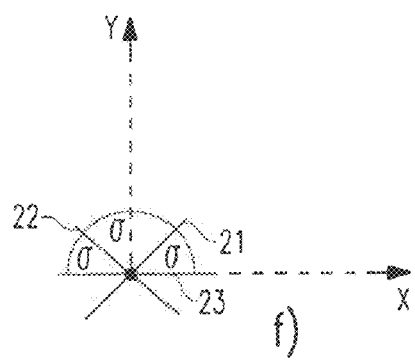
Figure 6:
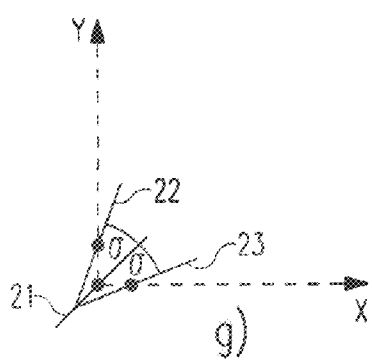

For larger image widths Δα, the present invention proposes the use of two or more line sensors, which are disposed at an angle to each other. This provides for less reduction of the ribbon width and eliminates dead spots. Possible arrangements of the sensors and their field of views are depicted in FIG. 6. Shown are up to three line sensors 21, 22, 23 identical to the line sensor 1 described above. Each line sensor has a conical field of view. The field of view planes of all sensors 21, 22, 23 are assumed to be vertical (parallel to or including the z-axis) and each field of view is assumed to be mirror symmetric in relation to a vertical plane. Generally, this need not be the case however. Each line sensor is indicated by a line. The orientation of the line indicates the orientation of the field of view. The center of the field of view (the origin of all antenna beam directions 7) is indicated by a dot. Each of the sensor's fields of view is oriented such that it receives electromagnetic radiation reflected by the mirror 2.

In the first arrangement a), the sensor 21 is arranged along the y-axis exactly as the line sensor 1 in the embodiment having only one line sensor 1. The center of the field of view of the first sensor 21 lies on the rotation axis 6 (i.e. the z-axis). The second line sensor 22 is arranged along the x-axis. Thus, the sensors 21, 22 are arranged at an angle σ=90° and their field of view planes intersect at an angle of σ=90°. When the mirror 2 is in a dead spot position (90° or 270°) in relation to the sensor 21, the mirror is in optimum position (maximum ribbon width) in relation to the sensor 22. Therefore, the problem of dead spots is overcome.

In the second arrangement b), the sensor 21 is arranged along the y-axis and the sensor 22 is arranged along the x-axis. Thus, the sensors 21, 22 are arranged at an angle σ=90° and their field of view planes intersect at an angle of σ=90°. Both the center of the field of view of the first sensor 21 and the center of the field of view of the second sensor 22 lie on the rotation axis 6. When the mirror 2 is in a dead spot position (90° or 270°) in relation to the sensor 21, the mirror 2 is not in a dead spot position in relation to the sensor 22 due to the intersection of the field of view planes. Therefore, the problem of dead spots is overcome.

In the third arrangement c), the sensors 21, 22 are arranged at an angle σ<90° and their field of view planes intersect at an angle σ<90°. None of the field of view centers is located on the axis of rotation 6.

In the fourth arrangement d), the sensors 21, 22 are arranged at an angle σ<90° and their field of view planes intersect at an angle σ<90°. Both field of view centers are located on the axis of rotation 6.

In the fifth arrangement e), the sensors 21, 22, 23 are arranged at an angle σ=60° and their field of view planes intersect at an angle σ=60°. None of the field of view centers is located on the axis of rotation 6.

In the sixth arrangement f), the sensors 21, 22, 23 are arranged at an angle σ=60° and their field of view planes intersect at an angle σ=60°. Each of the field of view centers is located on the axis of rotation 6.

In the seventh arrangement g), the sensors 21, 22, 23 are arranged at an angle σ<60° and their field of view planes intersect at an angle σ<60°.

The arrangements b), d) and f), where the centers of each field of view lie on the rotation axis 6, have the advantage that the various ribbons are arranged substantially in the horizontal. When such arrangement is not possible (e.g. due to the use of generic line sensors 21, 22, 23 which can not be crossed) it may be advantageous to locate sensors 21, 22, 23 and/or their field of view centers (the origin of all antenna beam directions 7) as close as possible to the axis of rotation 6 in order to minimize the ribbon's deviations from the horizontal. Some of the configurations a), c), e) and g) may not be optimal in this respect.

The arrangements c), d) and g), where the n field of view planes of the n line sensors are provided at an angular distance σ≤180°/n, have the advantage that they provide for the largest minimum ribbon width in a specific section of the ribbon for any arrangement of n line sensors.

The arrangements a), b), e) and f), wherein the n field of view planes of the n line sensors are provided at equal angular distance σ=180°/n, have the advantage that they provide for the largest minimum ribbon width of any arrangement of n line sensors.

The processing and control unit 8 advantageously is adapted to merge all the (image) information provided by the various line sensors 21, 22, 23 into a single 2D image (e.g. 360° panorama image).

The mirror 2 is driven by the motor 3. The mirror 2 may for example be driven so as to rotate always in one direction (e.g. in embodiments where an images of small width Δα is taken) or may be driven so as to alternately rotate clockwise and anti-clockwise (e.g. in embodiments where images of wide widths Δα are taken). The mirror may for example be driven stepped (in accordance with line image taken by the line sensor 1) or be driven with constant angular speed (at least during the recording of an image).

Still images and/or moving images (video) may be obtained with the sensor unit.

The invention claimed is:

1. A sensor unit comprising:
   a reflecting element mounted to be rotatable around an axis of rotation;
   a fixed line sensor operating in the microwave, millimeter wave or terahertz frequency range, the fixed line sensor having a field of view directed towards the reflecting element; and
   an image processor configured to adjust a width of the field of view of the line sensor based on a rotation angle of the reflecting element,
   wherein the reflecting element rotates about the axis of rotation to sweep the field of view of the fixed line sensor over a two-dimensional field of view plane, and the axis of rotation intersects with a reflection plane of the reflecting element.

2. The sensor unit according to claim 1, wherein the axis of rotation is parallel to a field of view plane of the fixed line sensor.

3. The sensor unit according to claim 1, wherein the fixed line sensor is mounted on the axis of rotation.

4. The sensor unit according to claim 1, wherein the fixed line sensor is adapted to electrically scan its field of view.

5. The sensor unit according to claim 1, wherein the fixed line sensor is a frequency sweeping line sensor.

6. The sensor unit according to claim 1 further comprising:
- one or more further line sensors operating in the microwave, millimeter wave or terahertz frequency range and having the respective one or more fields of view directed towards the reflective element,
- wherein the field of view plane of each line sensor intersects with the field of view plane of each other line sensor.

7. The sensor unit according to claim 6, wherein a number of line sensors is n and n field of view planes of the n line sensors are provided at equal angular distance $\sigma=180°/n$.

8. The sensor unit according to claim 6, wherein a number of line sensors is n and n field of view planes of the n line sensors are provided at an angular distance $\sigma \leq 180°/n$.

9. The sensor unit according to claim 1, further comprising:
- a motor including a fixed part and a movable part, said reflecting element being fixed to the movable part with supporting elements to rotate said reflecting element around said axis of rotation, said motor being of annular shape and surrounding said fixed line sensor.

10. The sensor unit according to claim 9, wherein the motor rotates the reflection element alternately in a clockwise and an anti-clockwise direction.

* * * * *